(12) United States Patent
Chen

(10) Patent No.: US 8,751,195 B2
(45) Date of Patent: Jun. 10, 2014

(54) METHOD FOR AUTOMATICALLY SHIFTING A BASE LINE

(75) Inventor: Po-Tsang Chen, New Taipei (TW)

(73) Assignee: Inotera Memories, Inc., Taoyuan County (TW)

( * ) Notice: Subject to any disclaimer, the term of this patent is extended or adjusted under 35 U.S.C. 154(b) by 405 days.

(21) Appl. No.: 13/228,896

(22) Filed: Sep. 9, 2011

(65) Prior Publication Data

US 2012/0004890 A1    Jan. 5, 2012

Related U.S. Application Data

(63) Continuation-in-part of application No. 12/401,134, filed on Mar. 10, 2009, now abandoned.

(30) Foreign Application Priority Data

Sep. 24, 2008  (TW) ............................... 97136606 A

(51) Int. Cl.
*G05B 19/418*    (2006.01)

(52) U.S. Cl.
CPC .................. *G05B 19/4184* (2013.01)
USPC ........................................................... 702/179

(58) Field of Classification Search
CPC .................................................. G05B 19/4184
USPC ........................................................... 702/179
See application file for complete search history.

(56) References Cited

U.S. PATENT DOCUMENTS 8,301,406 B2 * 10/2012 Lee et al. ......................... 702/77
8,600,917 B1 * 12/2013 Schimert et al. ................ 706/14

* cited by examiner

*Primary Examiner* — Bryan Bui
(74) *Attorney, Agent, or Firm* — Rosenberg, Klein & Lee

(57) ABSTRACT

A method for automatically shifting the base line has the following steps. First step is inserting the PM data into the processing data and calculating the original mean value of each section. Depending on the absolute value of the difference between each data point and the first mean value of each section, the data points are ranked. Next step is selecting the data points in the front N % of the ranked data points and then calculating the mean value and standard deviation. Next step is filtering the outlier data and calculating the base lines of each section. At last, the base lines are shifted and corrected into the same level so that the correlation error caused by base line shift is eliminated.

7 Claims, 13 Drawing Sheets

METHOD FOR AUTOMATICALLY SHIFTING A BASE LINE

CROSS REFERENCE TO RELATED APPLICATION

This application is a continuation-in-part of U.S. application Ser. No. 12/401,134, filed on Mar. 10, 2009 and entitled "METHOD FOR AUTOMATICALLY SHIFTING A BASE LINE", now pending.

BACKGROUND OF THE INVENTION

1. Field of the Invention

The present invention relates to a method for automatically shifting the base line, and in particular to a method for compensating the shifting of the base line due to PM of tools.

2. Description of Related Art

With the development of semiconductor technology, more and more functional electronic devices related to semiconductor are manufactured. Consequently the semiconductor manufacturing processes is developed from 6 inches wafer to 12 inches wafer. The yield of the manufacturing processes has to be improved so as to increase the profit of product. Many statistic and analyzing methods have been developed and applied for monitoring the manufacturing parameters in order to achieve the high yield.

Now, the automatic manufacturing tools or equipment are used for manufacturing semiconductors and tools are arranged for predictive maintenance (PM) in order to maintain the function of tools. On the other hand, when the performance of the tools is under monitoring, it is necessary for repairing the tools. However, there is huge error in the parameter analysis due PM, for example, the base line of the tool shifts. Please refer to FIGS. 1 to 1B; a gas flow (i.e., processing data) and a length of structure (i.e., measurement data) are analyzed for figuring out the correlation. Because of the shifting of base line, the analyzed data separates into two zones and a correlation error occurs in this data distribution. FIG. 1 shows the processing data in time series (gas flow parameter in time series) and the measurement in time series (length in time series), and the broken lines define a PM section. FIG. 1A shows the base lines of processing section before predictive maintenance 10', a predictive maintenance section 11', and a processing section after predictive maintenance 12' are shifted due to PM. FIG. 1B shows that there is correlation error in correlation analysis.

Traditional, the analyzer ignores the shifted section and simply selects the stable section to calculate the correlation. However, the data analysis is not precise because some information is missed. Furthermore, analyzer only the data excluded the data in PM section by experience. Thus, this method is used for selecting data point by human with low efficiency and the method has no coincidence for difference cases. In another words, the traditional method can not be used for analyzing a mount of data with high efficiency.

Therefore, in view of this, the inventor proposes the present invention to overcome the above problems based on his expert experience and deliberate research.

SUMMARY OF THE INVENTION

The primary object of the present invention provides a method for automatically shifting a base line. The method is applied for compensating the shifting of the base line due to the PM of tools or chambers. For example, the front N % of data points are selected and ranked for filtering the noise so that the base line can be normalized and the correlation analysis can be more precise to represent the relationship of the processing data and the measurement.

In order to achieve the above object, the present invention provides a method for method for automatically shifting a base line. The method includes the following steps. Step 1 is collecting processing data in time series and predictive maintenance (PM) data in time series, and inserting the predictive maintenance (PM) data into the processing data for figuring out a processing section before predictive maintenance, a predictive maintenance section, and a processing section after predictive maintenance. Step 2 is calculating an original mean value and an original standard deviation for each section. Step 3 is filtering outlier data, and calculating a first mean value and a first standard deviation for each section. Step 4 is calculating a difference between value of each data point of each section and ranking the data points of each section depending on absolute value of the difference. Step 5 is selecting front N % data points of each section of the processing section and calculating a second mean value and a second standard deviation for the front N % data points of each section. Step 6 is filtering outlier data, and calculating a third mean value and a third standard deviation for each section and the third mean value of each section defines a base line of each section. Step 7 is shifting and aligning the base lines of the sections.

The present invention demonstrates a mathematic method which can be automatically executed by computer program for normalizing the base lines so that the analysis efficiency is highly improved. Moreover, the shifting of the base lines is corrected for precisely analyzing the correlation between the processing data and the measurement data.

In order to better understand the characteristics and technical contents of the present invention, a detailed description thereof will be made with reference to the accompanying drawings. However, it should be understood that the drawings and the description are illustrative only and are not for limiting the scope of the present invention.

DETAILED DESCRIPTION OF THE PREFERRED EMBODIMENTS

Figure 1:
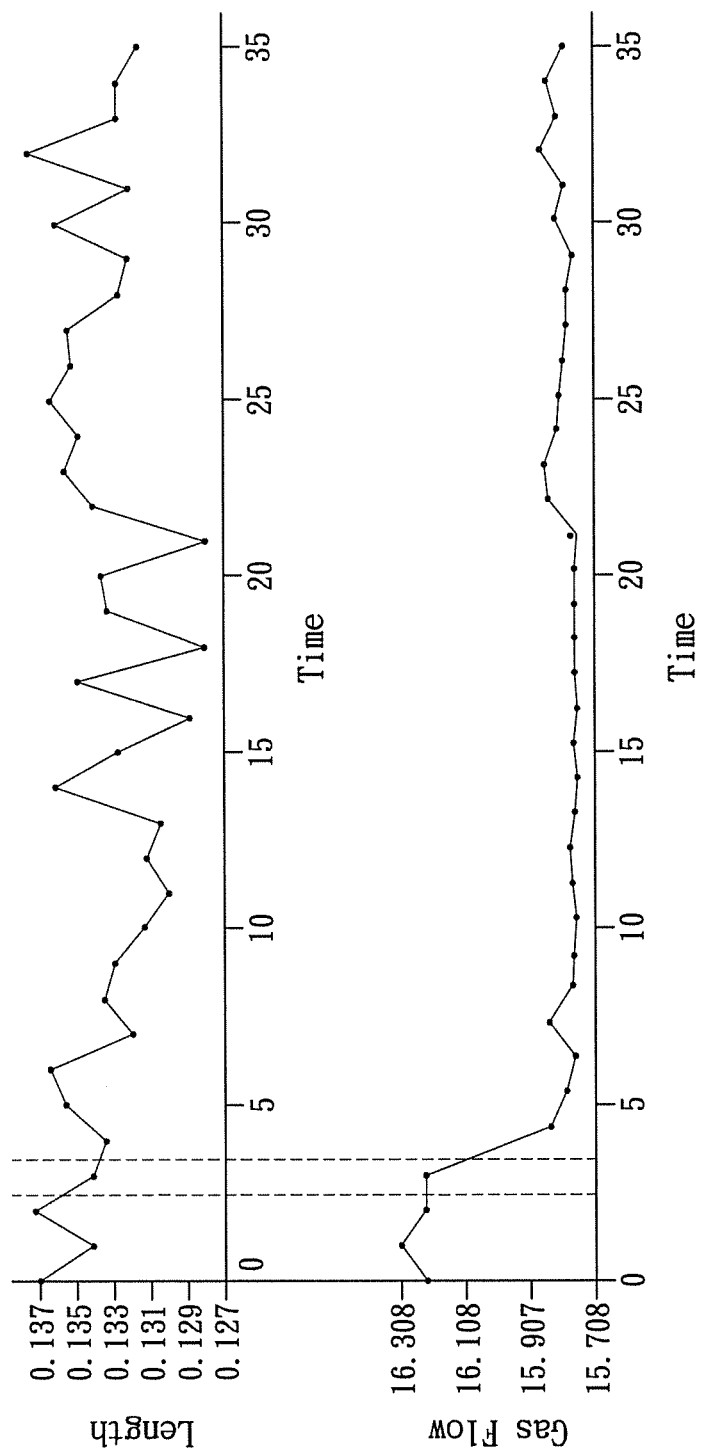
FIGS. 1 to 1B show the correlation error analyzed by the traditional method.
Figure 1A:
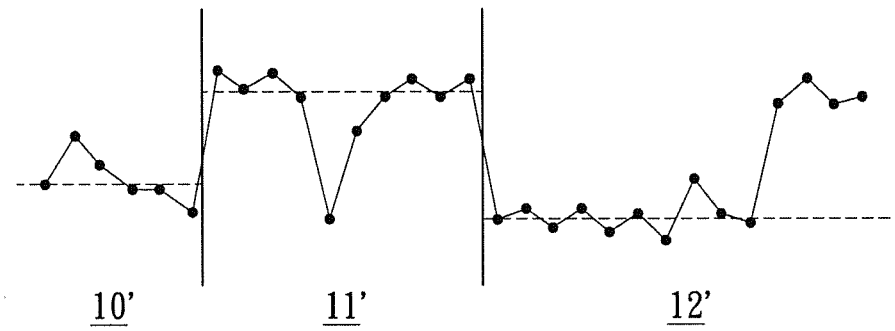
Figure 1B:
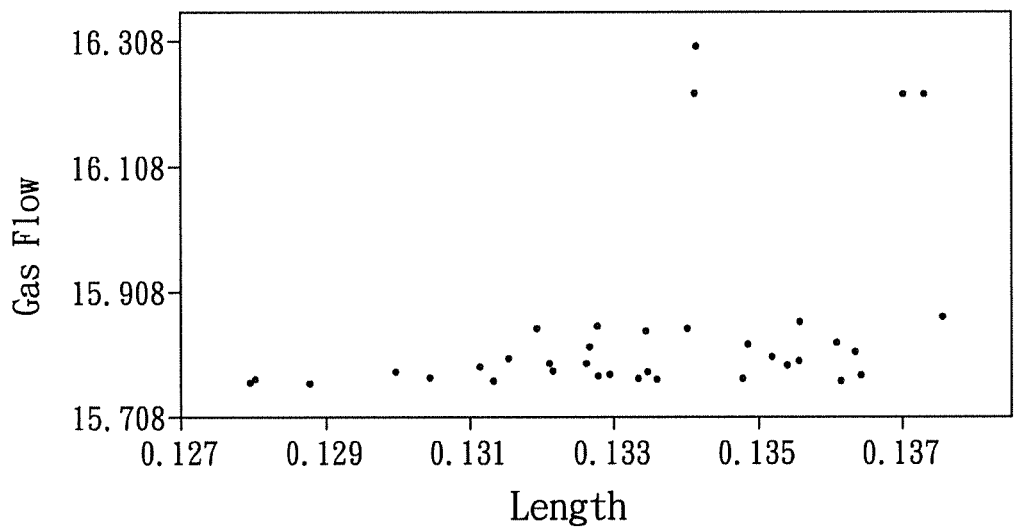
Figure 2:
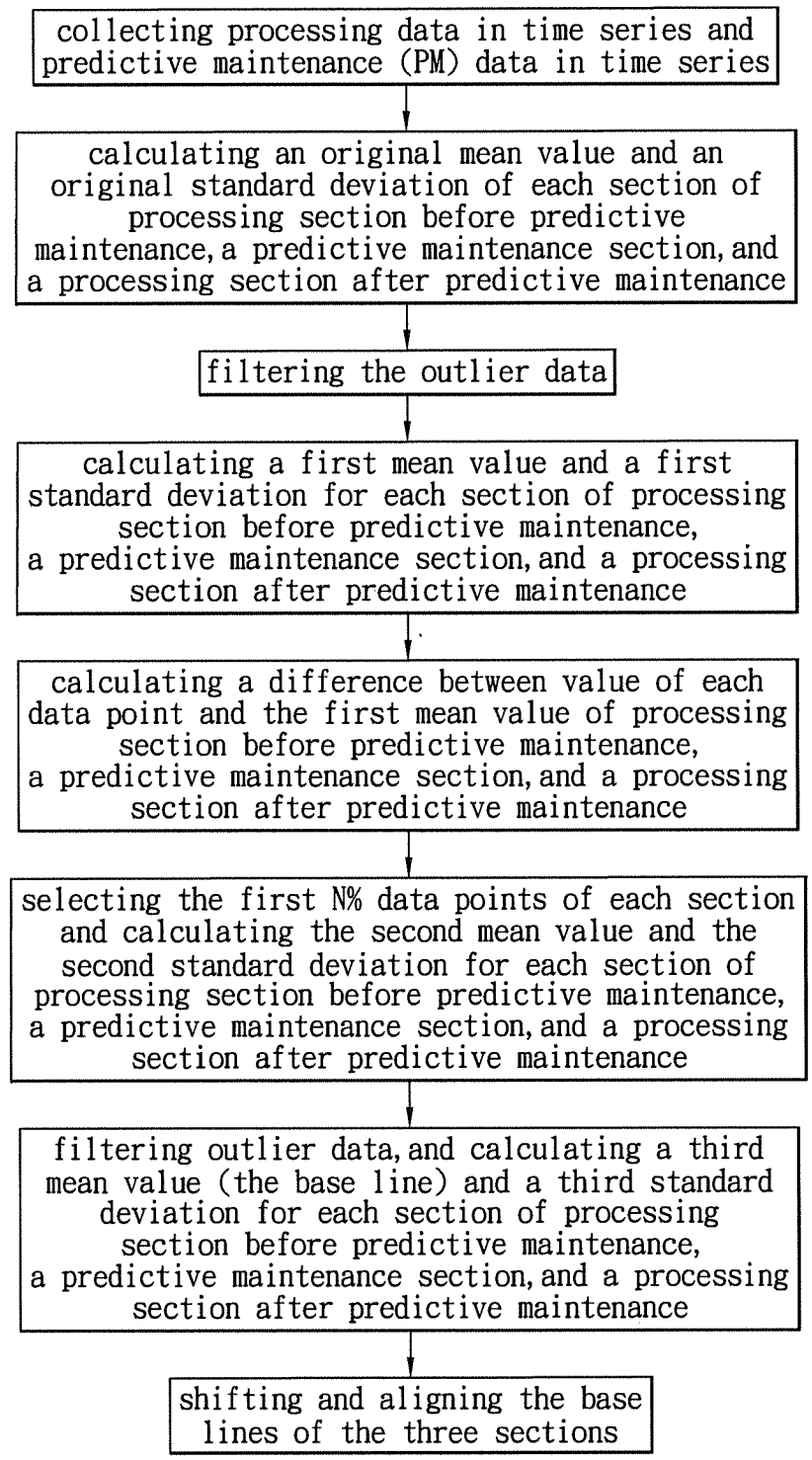
FIG. 2 is a flowchart showing the method according to the present invention.
Figure 3A:
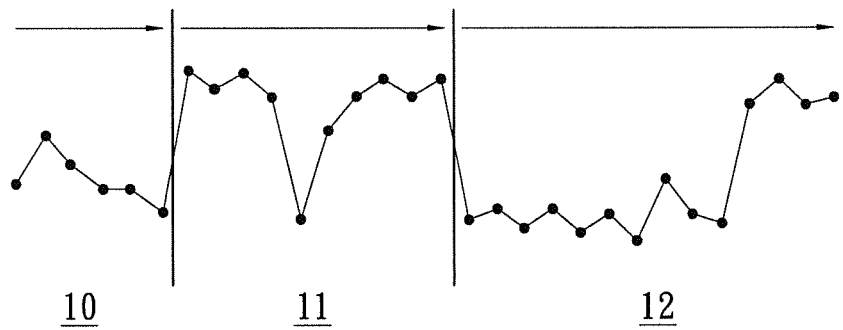
FIGS. 3A to 3E are diagrams showing the steps of the method according to the present invention.
Figure 7:
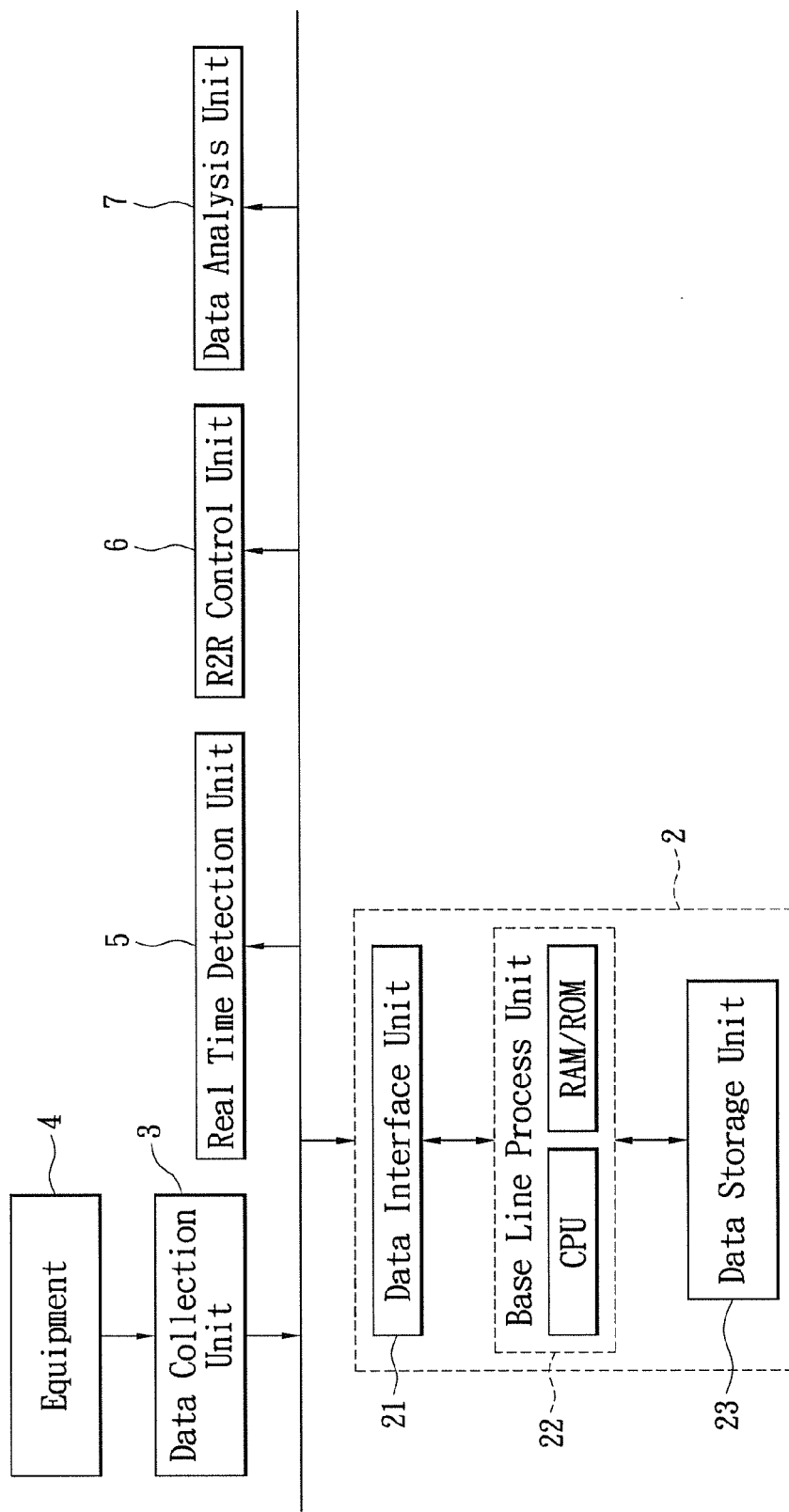
FIG. 7 shows the base line processing system according to the present invention.
Figure 8:
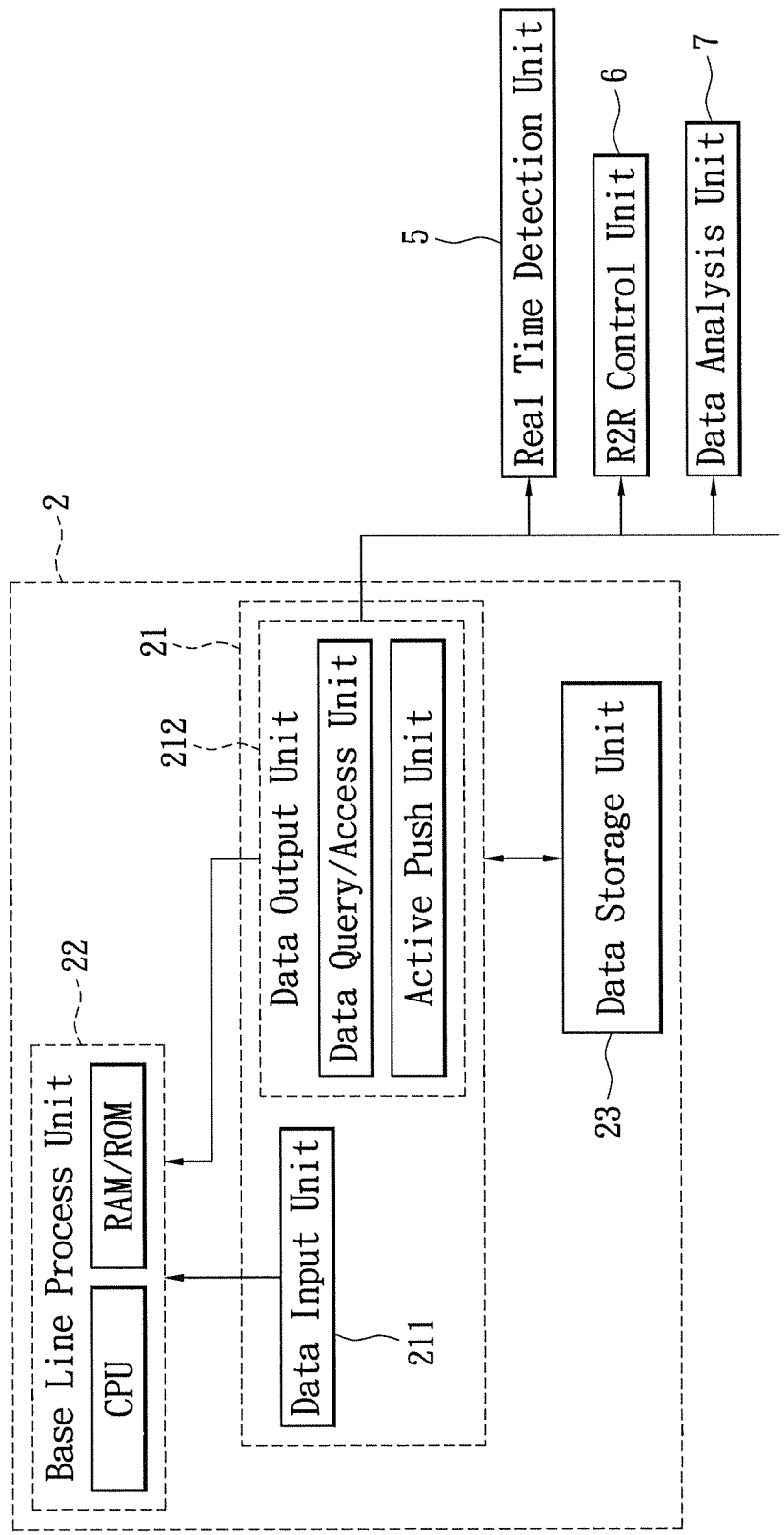
FIG. 8 shows the detail diagram of the base line processing system according to the present invention.

Please refer to FIGS. 2, 7 and 8; the present invention provides a method for automatically detecting and shifting a base line and a base line processing system 2. The method is used for solving the correlation error between the processing data in time series and the measurement data in time series, and the correlation error occurs after the tools or chambers has predictive maintenance (PM). The base line processing system 2 includes a data interface unit 21, a base line process unit 22 and a data storage unit 23. The method has the following steps (please refer in conjunction to FIG. 3A to FIG. 3E):

Step one is collecting data of equipment 4, such as a manufacture-processing tool or a metrology tool in time series by a data collection unit 3. The first step is collecting processing data in time series and predictive maintenance (PM) data in time series and the predictive maintenance data in time series is "inserted" into the processing data in time series to define three sections in time series: processing section before predictive maintenance 10, a predictive maintenance section 11, and a processing section after predictive maintenance 12. In detail, the first step is collecting two kinds of data: processing data (i.e., gas flow) and measurement data (i.e., length). The three sections are calculated by the data shown in FIG. 1. The collected data includes processing data in time series and predictive maintenance data in time series. Therefore, the present invention is providing for shifting the base line and figuring out the correct correlation between the processing data and measurement data. The data is collected by analyzing the PM starting time and the PM finishing time, thus the data can be precisely defined into three sections in time series: processing section before predictive maintenance 10, a predictive maintenance section 11, and a processing section after predictive maintenance 12 (shown in FIG. 3A). Each point in FIG. 3A represents a processing data point (FDC data point). As shown in FIG. 3A, the collected processing data and the predictive maintenance (PM) data are inputted to the base line process unit 22 through the data input unit 211 of the data interface unit 21, and the processing data is calculated to split by the predictive maintenance (PM) data by the base line process unit 22 which may include CPU, RAM/ROM and so on.

Furthermore, the processing data and measurement data can be classified depending on the tools or chambers, thus user can calculate the correlation between processing data and measurement data for each tool or chamber.

Figure 3B:
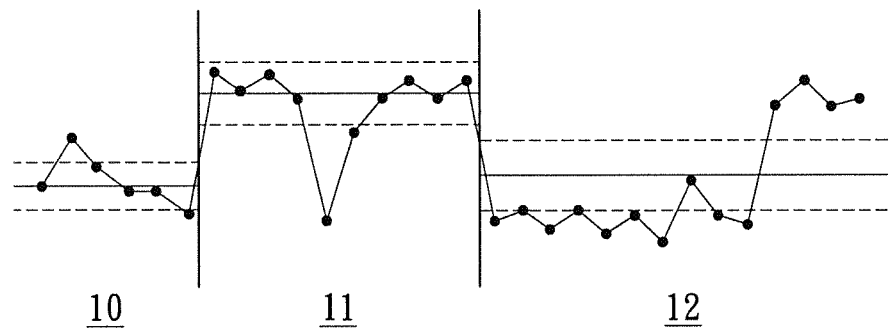
Figure 3C:
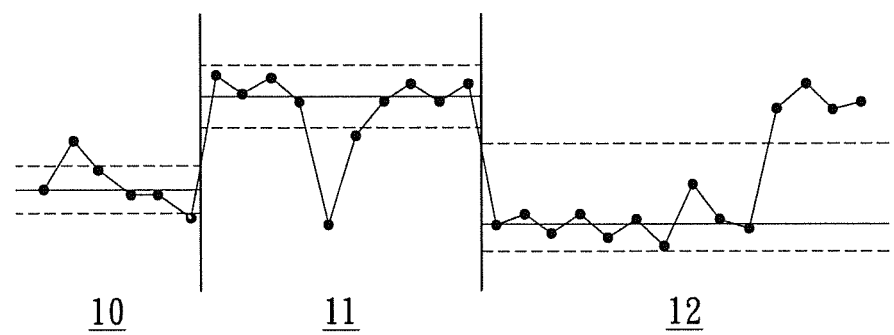

Step 2 is calculating an original mean value and an original standard deviation by the base line process unit 22. The data collected in step one is roughly analyzed in the two following steps. The original mean value and the original standard deviation of each data section/data sequence (i.e., processing section before predictive maintenance 10, a predictive maintenance section 11, and a processing section after predictive maintenance 12) is calculated. Then the outlier data is filtered (Step three). There is noise inside the original data, thus Step three is executed for roughly filtering the noise by a 3 sigma method. A certain cutoff for the 3-sigma confidence interval may to be used to screen out data that do not meet the criteria. Then, the filtered data is used for calculating a first mean value and a first standard deviation for each section (i.e., processing section before predictive maintenance 10, a predictive maintenance section 11, and a processing section after predictive maintenance 12). The first mean values of the sections are shown as the horizontal lines in the three sections, and the first standard deviations of the sections are shown as the two horizontal broken lines in the three sections. As shown in FIG. 3B, the base lines of the three sections are not aligned (i.e., the base lines shifted) because of the PM, and the shifted base lines will cause the correlation error between the processing data and the measurement data. The present invention provides some following steps for eliminating the shifting issue.

Next step is calculating a difference between value of each data point and the first mean value. For example, the difference between the value of each data point in processing section before predictive maintenance 10 and the first mean value of the processing section before predictive maintenance 10. Similarly, the difference is calculated for the predictive maintenance section 11 and the processing section after predictive maintenance 12. Then, the data points are ranked depending on the absolute value of the calculated difference. For example, the data points in processing section before predictive maintenance 10 are ranked depending on the absolute value of the difference. In the embodiment, the data points in processing section before predictive maintenance 10 are ranked from the smallest to the largest absolute value of the difference. The same method is executed for the predictive maintenance section 11 and the processing section after predictive maintenance 12.

Step 5 is selecting data points of each section. The front N % points of the ranked data points are selected for calculating the second mean value and the second standard deviation for each section. For example, the front N % points of the ranked data points which is sorted by absolute range from the first mean value in the processing section after predictive maintenance 12 are selected by the nearest-data method and the selected points are used for calculating the second mean value and the second standard deviation. The N value is selected by different tools or chambers. The N value is preferably selected from 85 to 95 and the 90 is used in the embodiment. Please note that the data points in the processing section after predictive maintenance 12 is non-normal distribution and the data points can be totally taken into consideration. Furthermore, the data points of the processing section before predictive maintenance 10 and the predictive maintenance section 11 are normal distribution and the method still can be applied for the two normal-distribution sections. Then the selected data points are used for calculating the second mean values and the second standard deviations for the three sections.

Figure 3D:
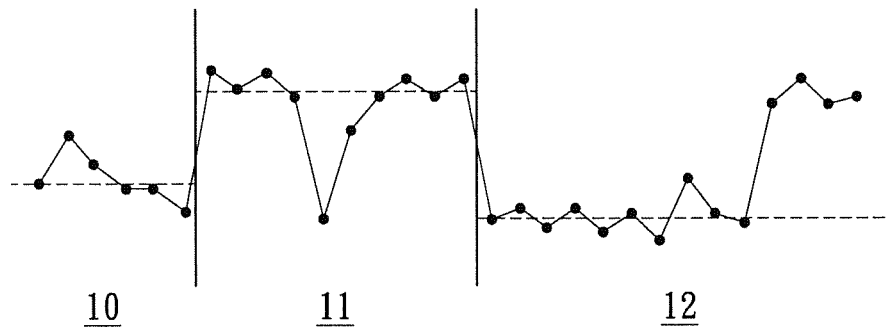
Figure 3E:
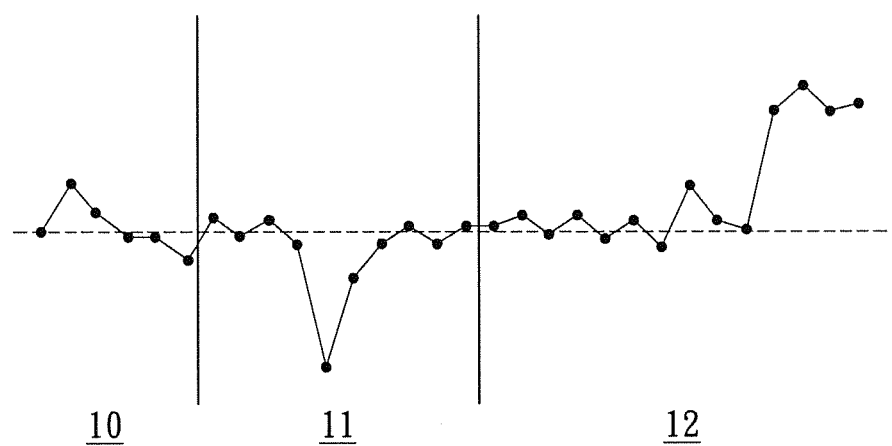

Step 6 is filtering outlier data, and calculating a third mean value and a third standard deviation for each section. After calculating the second mean values and the second standard deviations for the three sections, a filtering step is executed again. In the embodiment, the outlier data points are filtering by 3 sigma method. The filtered data points are used for calculating the third mean value and the third standard deviation for each section shown in FIGS. 3C and 3D. The mean values of the processing section before predictive maintenance 10, the predictive maintenance section 11, and the processing section after predictive maintenance 12 represent the base lines of the processing section before predictive maintenance 10, a predictive maintenance section 11, and a processing section after predictive maintenance 12. Accordingly, the steps 2 to 6 are used to calculate the base line of the three data sections/data sequences (i.e., processing section 10, a predictive maintenance section 11, and a processing section 12) by the base line process unit 22, as shown in FIG. 3D.

The final step is shifting and aligning the base lines of the three sections. In the step, the three shifted base lines are moved for correcting the shifting phenomenon because of PM for the tools or chambers. Therefore, the correlation between the processing data and the measurement data is clearly analyzed (shown in FIG. 3E). The processed data sections/data sequences having the shifted base lines are outputted from the base line process unit 22 to the data output unit 212 of the data interface unit 21. Furthermore, the collected raw data (i.e., the processing section 10, a predictive maintenance section 11, and a processing section 12) and the processed data sections/data sequences having the shifted base lines may be stored in the data storage unit 23.

On the other hand, the data interface unit 21 may output the processed data sections/data sequences having the shifted base lines to a real time detection unit 5, a R2R time detection unit 6 or a data analysis unit, which needs the processed data.

Three cases are shown for explaining the effect of the present invention. FIGS. 4A to 4D show the front case. FIGS. 5A to 5D and the FIGS. 6A to 6D respectively show the second and the third cases. The zone between two vertical broken lines of each case is a PM section. FIGS. 4A, 4C, 5A, 5C, 6A and 6C show data in time series, and FIGS. 4B, 4D, 5B, 5D, 6B, 6D show the correlation drawings.

Figure 4A:
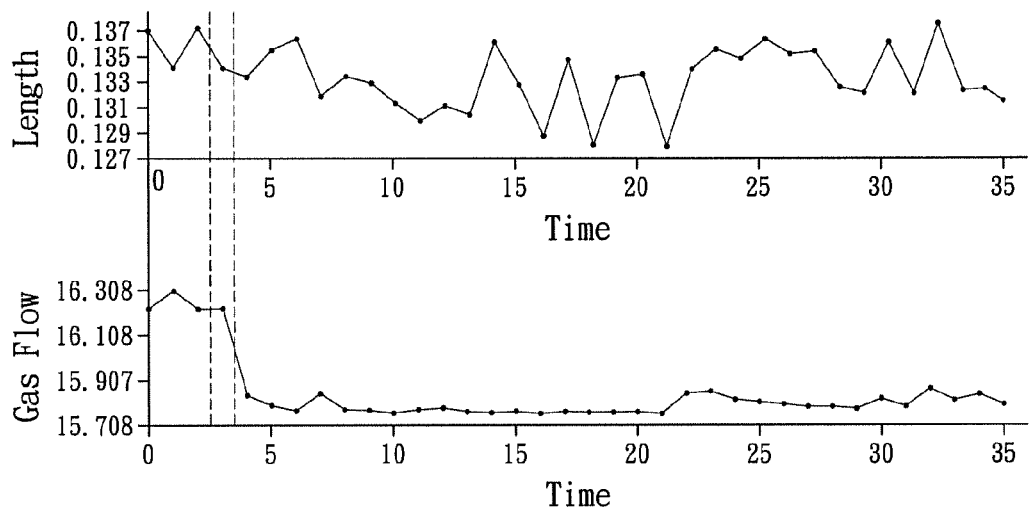
FIGS. 4A to 4B are diagrams showing the correlation of the front case by the traditional method.
Figure 4B:
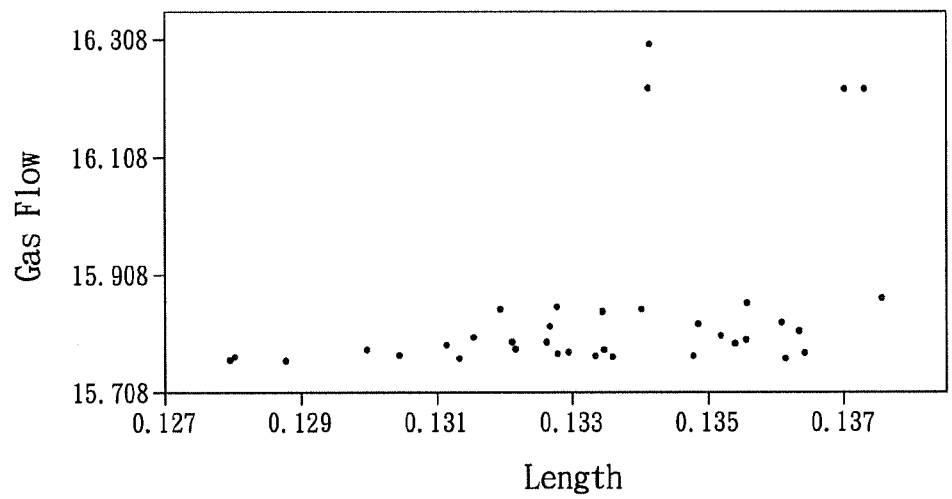
Figure 4C:
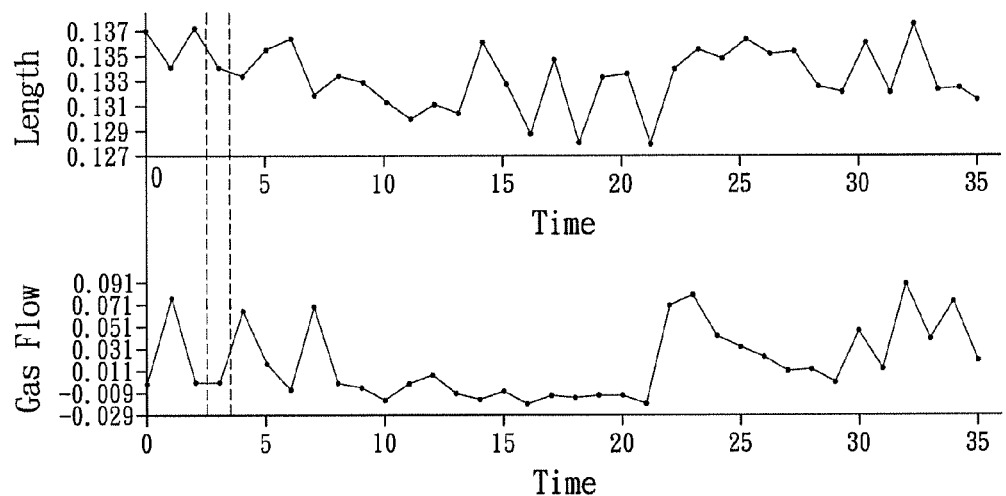
FIGS. 4C to 4D are diagrams showing the correlation of the front case according to the present invention.
Figure 4D:
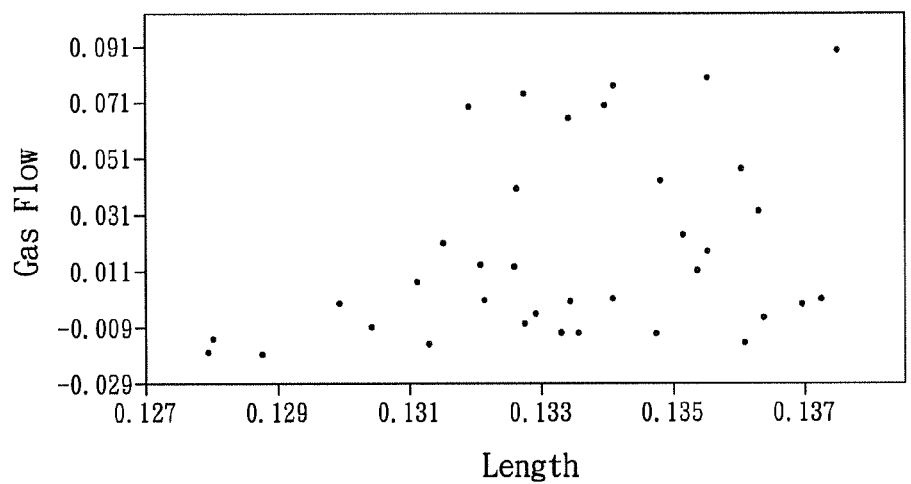

FIGS. 4A to 4B are the correlation result by traditional method. There are two separate data zones; therefore, the separate data shows the correlation error between the processing data and the measurement data. FIGS. 4C and 4D show the result analyzed by the method of the present invention. The data distributes evenly in the drawing and the correlation can correctly represent the relation between the processing data and the measurement data. Thus, user can adjust the parameters depending on the analyzing result.

Figure 5A:
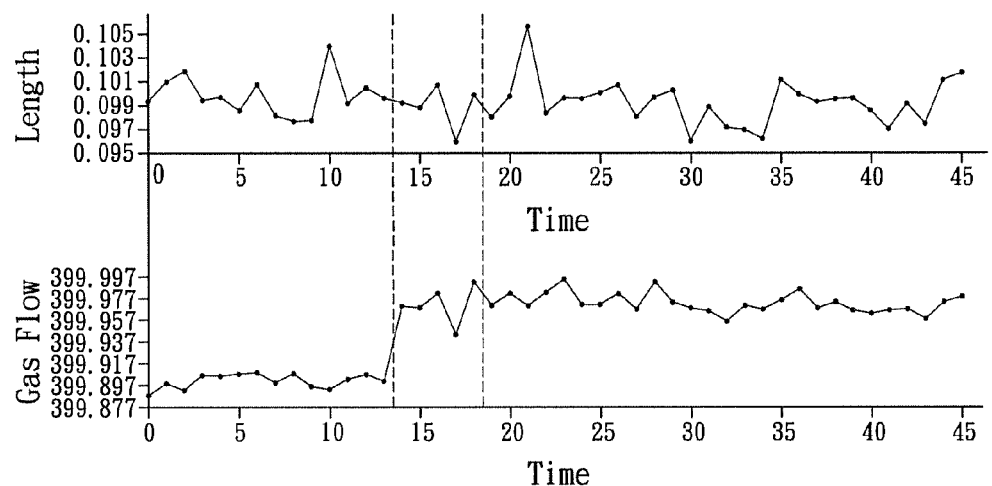
FIGS. 5A to 5B are diagrams showing the correlation of the second case by the traditional method.
Figure 5B:
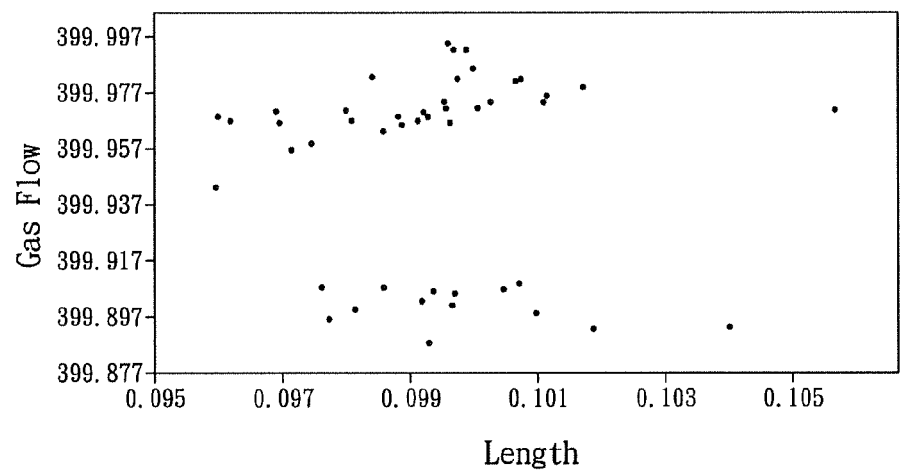
Figure 5C:
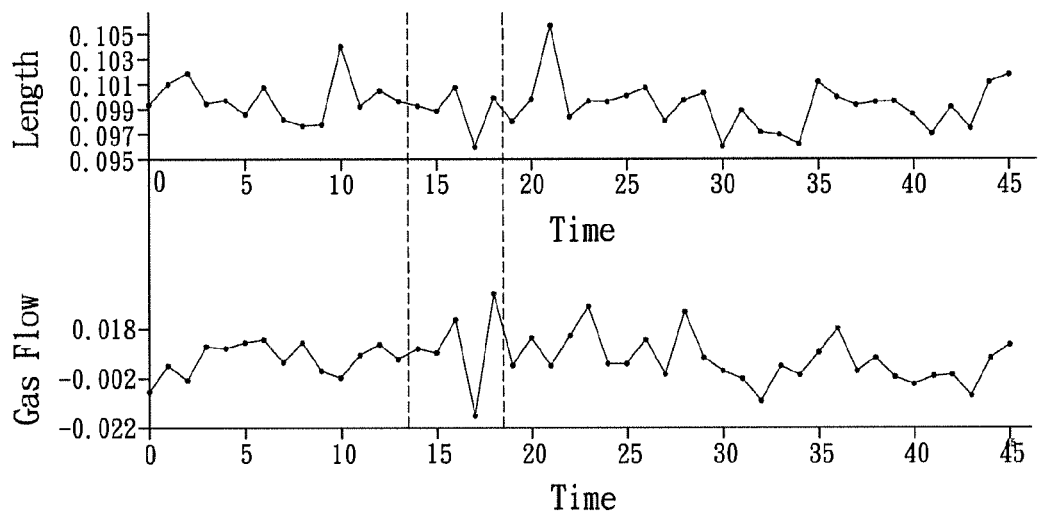
FIGS. 5C to 5D are diagrams showing the correlation of the second case according to the present invention.
Figure 5D:
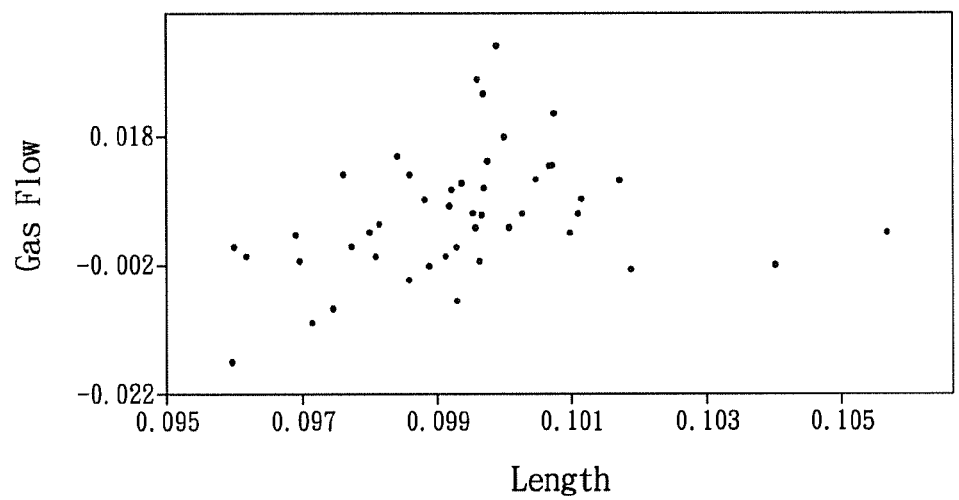

FIGS. 5A to 5B are the correlation result by traditional method. There are two separate data zones; therefore, the separate data shows the correlation error between the processing data and the measurement data. FIGS. 5C and 5D show the result analyzed by the method of the present invention. The data distributes evenly in the drawing and the correlation can correctly represent the relation between the processing data and the measurement data. Thus, user can adjust the parameters depending on the analyzing result. Furthermore, the R value of the present method is better than the R value of the traditional method. R value is Pearson's product-moment correlation index which shows the degree of correlation.

Figure 6A:
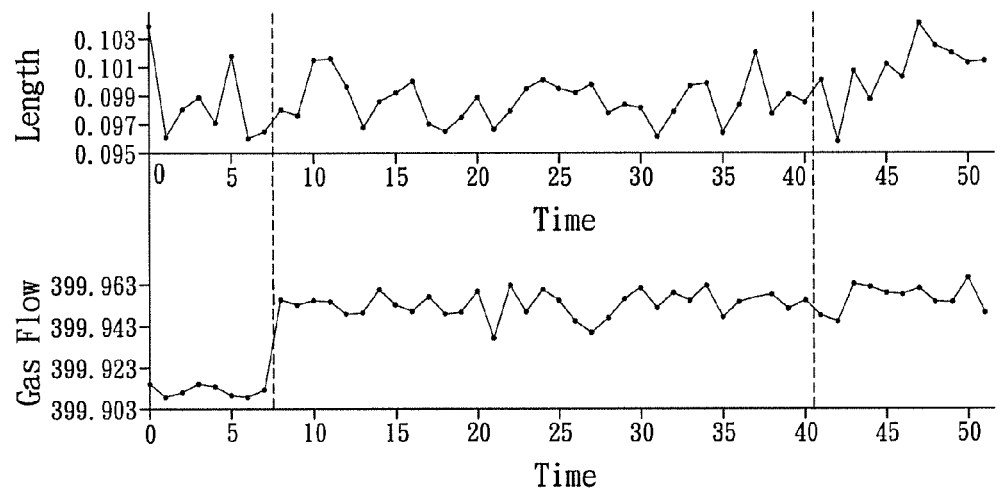
FIGS. 6A to 6B are diagrams showing the correlation of the third case by the traditional method.
Figure 6B:
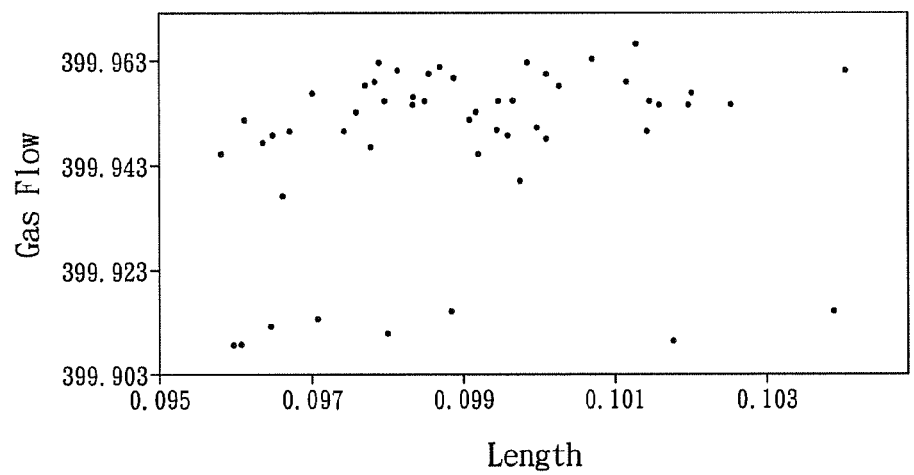
Figure 6C:
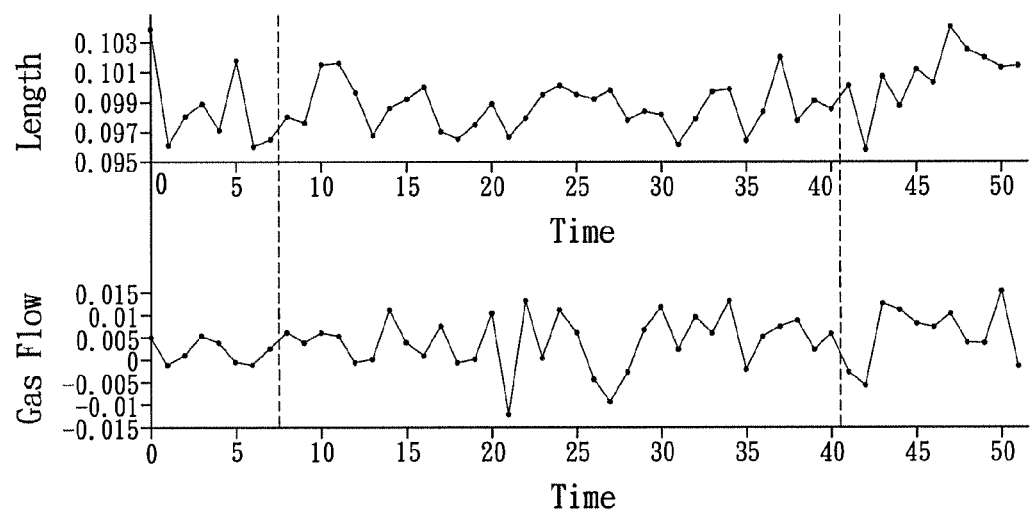
FIGS. 6C to 6D are diagrams showing the correlation of the third case according to the present invention.
Figure 6D:
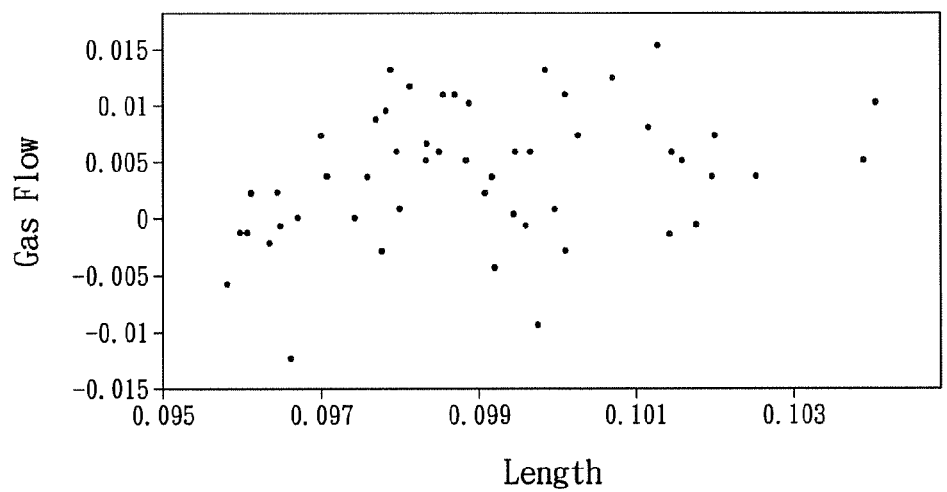

FIGS. 6A to 6B are the correlation result by traditional method. There are two separate data zones; therefore, the separate data shows the correlation error between the processing data and the measurement data. FIGS. 6C and 6D show the result analyzed by the method of the present invention. The data distributes evenly in the drawing and the correlation can correctly represent the relation between the processing data and the measurement data. Thus, user can adjust the parameters depending on the analyzing result. Furthermore, the R value of the present method is better than the R value of the traditional method.

Accordingly, the present invention provides some steps of data selecting, data filtering and data ranking for correcting the shifting base lines due to PM. The corrected base lines can be used for calculating the correlation between the processing data and the measurement data. Therefore, user can adjust the manufacturing parameters depending on the correlation analysis.

Therefore, the present invention provides some advantages as following.

1. The method of the present invention has some mathematic steps for automatically selecting, filtering and ranking data so that the method can be used in batch correlation analysis for mounts of data. Thus the analyzing efficiency is improved and the error of processing data by human is avoided.

2. The method is applied for data in non-normal distribution as well as for data in normal distribution. Therefore, the problem of calculating data in non-normal distribution by the traditional method is solved.

3. The base lines in each section (before PM, PM and after PM) are normalized for compensating the shifting of the base lines due to PM so that the correlation analysis between the processing data and the measurement data is more precise.

Even though the present invention has been described with reference to the foregoing preferred embodiment, it shall be understood that the present invention is not limited to the details thereof. Various equivalent variations and modifications may occur to those skilled in this art in view of the teachings of the present invention. Thus, all such variations and equivalent modifications are also embraced within the scope of the present invention as defined in the appended claims.

What is claimed is:

1. A method for automatically shifting a base line, comprising:

collecting processing data in time series and predictive maintenance (PM) data in time series by a data collection unit;

the collected processing data and the predictive maintenance (PM) data being inputted to a base line process unit through a data interface unit, and inserting the predictive maintenance (PM) data into the processing data for figuring out a processing section before predictive maintenance by a predictive maintenance section, and a processing section after predictive maintenance by the base line process unit;

calculating an original mean value and an original standard deviation for each section of the processing section before predictive maintenance by the predictive maintenance section, and the processing section after predictive maintenance by the base line process unit;

filtering outlier data, and calculating a first mean value and a first standard deviation for each section of the processing section before predictive maintenance by the predictive maintenance section, and the processing section after predictive maintenance by the base line process unit;

calculating a difference between value of each data point of each section of the processing section before predictive maintenance by the predictive maintenance section, and the processing section after predictive maintenance and the first mean value of each section of the processing section before predictive maintenance by the predictive maintenance section, and the processing section after predictive maintenance, and ranking the data points of each section of the processing section before predictive maintenance by the predictive maintenance section, and the processing section after predictive maintenance depending on absolute value of the difference by the base line process unit;

selecting front N % data points of each section of the processing section before predictive maintenance by the predictive maintenance section, and the processing section after predictive maintenance, and calculating a second mean value and a second standard deviation for the front N % data points of each section of the processing section before predictive maintenance by the predictive maintenance section, and the processing section after predictive maintenance by the base line process unit;

filtering outlier data, and calculating a third mean value and a third standard deviation for each section of the processing section before predictive maintenance by the predictive maintenance section, and the processing section after predictive maintenance, wherein the mean value of each section is a base line of each section of the processing section before predictive maintenance by the predictive maintenance section, and the processing section after predictive maintenance by the base line process unit; and shifting and aligning the base lines of the processing section before predictive maintenance by the predictive maintenance section, and the processing section after predictive maintenance by the base line process unit.

2. The method according to claim 1, wherein a 3-sigma method is used in each filtering outlier data step.

3. The method according to claim 2, wherein the step of collecting processing data in time series further comprises a step of collecting a measurement data in time series and classifying the processing data in time series depending on tools or chambers by the data collection unit.

4. The method according to claim 3, wherein the step of ranking the data points of each section is ranking the data points of each section depending on the increasing absolute value of the difference by the base line process unit.

5. The method according to claim 4, wherein a nearest-data method is used for selecting front N % data points of each section based on the absolute range from the first mean value by the base line process unit.

6. The method according to claim 5, wherein the N value is selected from 85 to 95.

7. The method according to claim 1, further comprising a step of outputting the processing section before predictive maintenance by the predictive maintenance section, and the processing section after predictive maintenance having the shifted base lines from the base line process unit to the data interface unit.

* * * * *